United States Patent Office 2,830,938
Patented Apr. 15, 1958

2,830,938
CATALYTIC DESULPHURISATION OF PETROLEUM HYDROCARBONS WITH COKE OVEN GAS AS SOURCE OF HYDROGEN

Frederick William Bertram Porter and Roy Purdy Northcott, Sunbury-on-Thames, England, assignors to The British Petroleum Company, Limited, London, England, a British corporation No Drawing. Application February 7, 1955
Serial No. 486,694

Claims priority, application Great Britain
February 19, 1954

2 Claims. (Cl. 196—28)

This invention relates to the catalytic desulphurisation of petroleum hydrocarbons.

The hydrocatalytic desulphurisation is well-known. According to this process, the feedstock to be desulphurised is contacted at elevated temperature and pressure with a sulphur-resistant hydrogenation catalyst in the presence of hydrogen or a hydrogen-rich gas, whereby organically combined sulphur is converted into hydrogen sulphide which may readily be removed from the treated feedstock. In the operation of the process, which may be applied to crude petroleum as well as to petroleum distillates and residues, it is customary to separate the hydrogen-rich gases from the desulphurised product and recycle them to the reaction zone, additional hydrogen being added to compensate for that consumed in converting the organically combined sulphur into hydrogen sulphide. In such a recycle process, it is necessary to use hydrogen of a purity of at least 95% by volume, since any impurities, e. g. nitrogen, carbon monoxide and carbon dioxide, present are concentrated in the recycling operation due to their comparatively low solubilities in petroleum oils and to the fact that they are not consumed during the reaction. It is apparent that if too high a concentration of such impurities is present, the partial pressure of the hydrogen in the gas mixture fed to the reaction zone will soon become too low to enable a satisfactory degree of desulphurisation to be obtained. In practice, it is unsatisfactory to begin operation with a gas containing less than 50% by volume of hydrogen.

Nevertheless, there are available several sources of hydrogen-rich gases containing sufficient hydrogen to be effective for hydrofining provided the build up of impurities in the gas could be avoided. Coke-oven gas is an example of such a gas.

According to the present invention, petroleum hydrocarbons are desulphurised by being contacted at elevated temperature and pressure with a sulphur-resistant hydrogenation catalyst in the presence of a gas containing 20% to 80% by volume of hydrogen, the remainder of the gas consisting of gases acting as inert diluents and having no deleterious effect on the desulphurisation reaction, and fresh gas being continuously supplied to the reaction zone without recycle of the gas separated from the treated hydrocarbons.

The process according to the present invention affords a particularly economical method of operation, since the gases recovered from the desulphurised hydrocarbons can be utilised as fuel gas, if desired after the separation of hydrogen sulphide, with little or no loss of calorific value.

The gas used according to the present invention may, for example, consist of coke-oven gas, or a gas derived from a thermal cracking operation from which the unsaturated components have been removed.

The process is particularly effective when carried out using highly active desulphurisation catalysts of the kind comprising the oxides of cobalt and molybdenum, either as such and/or in the form of cobalt molybdate, deposited on or incorporated with a support, such as alumina.

The process may be carried out under a wide range of process conditions similar to those employed in hydrofining processes operating with gas recycle. Preferably, the temperature is between 650 and 850° F., more especially between 750 and 850° F., and the pressure is up to 1500 lb./sq. in., more especially between 500 and 1500 lb./sq. in.

The invention will now be described with reference to the following examples.

Example 1

A Kuwait gas oil containing 1.25% wt. sulphur was passed at 780° F., 2 v./v./hr. space velocity and 500 p. s. i. ga. plant pressure, over a catalyst of the kind consisting of the oxides of cobalt and molybdenum supported on alumina, using coke-oven gas at the rate of 2000 s. c. f. per barrel of feed, without recycle. The coke-oven gas had the following composition:

| | Percent volume |
|---|---|
| $H_2$ | 53.3 |
| $N_2$ | 12.4 |
| $CO$ | 5.6 |
| $CO_2$ | 2.5 |
| $C_1-C_6$ | 26.2 |

The bulked product from 1000 hours' operation under these conditions had a sulphur content of 0.2% wt.

After separation from the cooled liquid product, the exit gases had the following composition:

Total exit gases _____ s. c. f./b__ 1,920
Composition:
| | | |
|---|---|---|
| $H_2$ | percent vol__ | 49.9 |
| $N_2$ | do____ | 12.8 |
| $CO$ | do____ | 5.8 |
| $CO_2$ | do____ | 2.3 |
| $C_1-C_6$ | do____ | 27.3 |
| $H_2S$ | do____ | 1.9 |

Example 2

A Kuwait gas oil containing 1.0% wt. sulphur was passed at 780° F., 2 v./v./hr. space velocity, and 500 p. s. i. ga. plant pressure, over a catalyst of the mixed oxides of cobalt and molybdenum on alumina type, using a 20% hydrogen/80% hydrocarbon gas obtained by scrubbing thermal cracker gases with naphtha to remove unsaturates, at the rate of 2000 s. c. f. per barrel of feed, without recycle. The bulked product from 200 hours' operation under these conditions had a sulphur content of 0.5% wt.

The inlet and exit gases had the following composition.

| Inlet Gas | 2,000 S. C. F./B., percent vol. | Exit Gas | 1,880 S. C. F./B., percent vol. |
|---|---|---|---|
| $H_2$ | 20 | $H_2$ | 18 |
| $C_1-C_6$ | 80 | $C_1-C_6$ | 81 |
| | | $H_2S$ | 1 |

We claim:
1. A process for the hydrocatalytic desulphurisation of petroleum hydrocarbons having a sulphur content of at least about 1% which comprises continuously supplying a mixture consisting essentially of said hydrocarbons and coke-oven gas to a reaction zone, and contacting said mixture therein with a catalyst consisting essentially of the oxides of cobalt and molybdenum incorporated with a support consisting essentially of alumina, at a temperature within the range 650°–850° F. and at a superatmospheric pressure up to 1500 p. s. i., continuously withdrawing desulphurised hydrocarbons and coke-oven gas from said zone, separating the withdrawn coke-oven gas and hydrocarbons from each other, and withdrawing the separated gas and hydrocarbons from the system without recycling the gas separated to the reaction zone.

2. A process for the hydrocatalytic desulphurisation of petroleum hydrocarbons having a sulphur content of at least about 1% which comprises continuously supplying a mixture consisting essentially of said hydrocarbons and coke-oven gas containing 20% to 80% by volume of hydrogen at all times throughout the operation but at least 50% by volume of hydrogen at the beginning of the operation and a substantial amount of carbon monoxide to a reaction zone and contacting said mixture therein with a catalyst consisting essentially of the oxides of cobalt and molybdenum incorporated with a support consisting essentially of alumina, at a temperature within the range 650°–850° F. and at a superatmospheric pressure up to 1500 p. s. i., continuously withdrawing desulphurised hydrocarbons and used coke-oven gas contaminated with hydrogen sulphide but of substantially undiminished calorific value from said zone, separating the withdrawn coke-oven gas and hydrocarbons from each other, withdrawing the separated gas and hydrocarbons from the system without recycling the gas separated to the reaction zone, and separating hydrogen sulphide from the withdrawn gas to obtain coke-oven gas of substantially undiminished calorific value as a desired product.

References Cited in the file of this patent
UNITED STATES PATENTS

| | | |
|---|---|---|
| 2,029,100 | Grosse | Jan. 28, 1936 |
| 2,037,789 | Ipatieff | Apr. 21, 1936 |
| 2,393,288 | Byrns | Jan. 22, 1946 |
| 2,440,673 | Jones | May 4, 1948 |